V. MICHET.
HAT PIN GUARD.
APPLICATION FILED MAY 20, 1913.
1,088,918.
Patented Mar. 3, 1914.
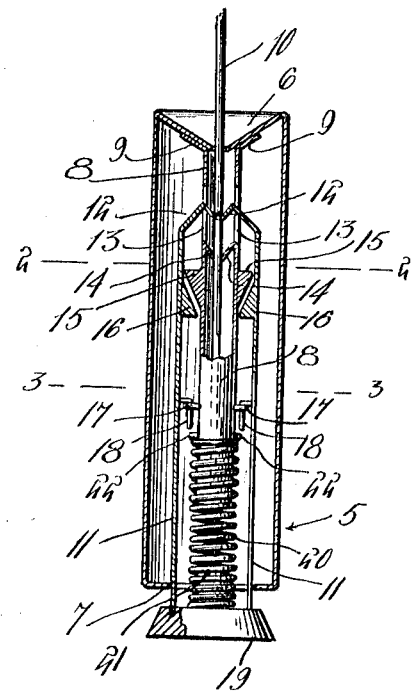
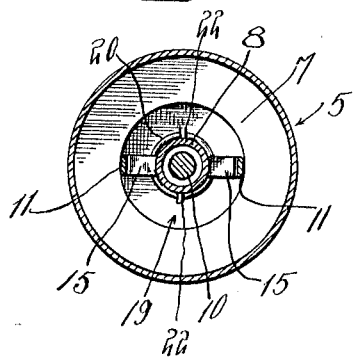
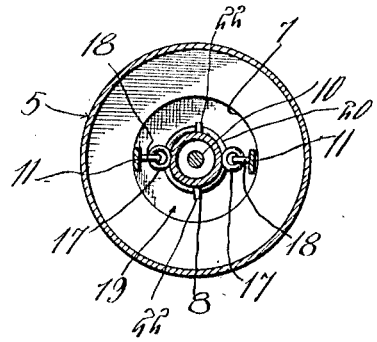
Witnesses
J. C. Simpson
Frank S. Ratcliff
Inventor
V. Michet
By Charles Chandler
Attorneys

UNITED STATES PATENT OFFICE.

VICTOR MICHET, OF KNIFE RIVER, MINNESOTA.

HAT-PIN GUARD.

1,088,918.  Specification of Letters Patent.  Patented Mar. 3, 1914.

Application filed May 20, 1913. Serial No. 768,896.

*To all whom it may concern:*

Be it known that I, VICTOR MICHET, a citizen of the United States, residing at Knife River, in the county of Lake, State of Minnesota, have invented certain new and useful Improvements in Hat-Pin Guards; and I do hereby declare the following to be a full, clear, and exact description of the invention, such as will enable others skilled in the art to which it appertains to make and use the same.

This invention relates to new and useful improvements in hat pin point protectors and guards.

The object of the invention is to provide a simple guard which, when the point of a hat pin is inserted therein will be securely locked thereon against undesired removal.

A further object of the invention resides in the provision of means whereby the hat pin guard may be readily disengaged from its locking connection with the pin.

With these and other objects in view, the invention resides in the novel combination, formation and arrangements of parts to be more fully hereinafter described and illustrated in the accompanying drawings and particularly pointed out in the claims hereto appended.

Reference is had to the accompanying drawings wherein similar characters of reference designate corresponding parts throughout the several views, and in which:

Figure 1 is a vertical longitudinal sectional view of the device. Fig. 2 is a transverse sectional view taken on the line 2—2 of Fig. 1, and Fig. 3 is a transverse sectional view taken on the line 3—3 of Fig. 1.

Referring now to the drawings, wherein is shown the preferred form of the invention, 5 designates the outer casing which is cylindrical in shape and is provided at its receiving end with a concave centrally apertured portion 6. The other end of the casing is provided with an inwardly extending flange 7. Centrally positioned in the casing and terminating short of the flange end thereof is a pin receiving cylindrical member 8 which is provided at one end with the flange 9 for securing the said member to the portion 6 of the outer casing. The pin 10 is held within this member 8 by means of leaf springs 11 which are positioned on each side of the cylindrical member and are provided with inwardly extending jaw portions 12 passed through diametrically opposed openings 13 in the wall thereof adjacent the receiving end. To insure the proper insertion of the pin and to prevent the pin 10 from engaging in one of the openings 13 the cylindrical member is provided on its inner periphery with a downwardly extending flange 14.

The means for disengaging the springs 11 from the pin comprise a pair of blocks 15 carried by diametrically opposed portions of the outer periphery of the cylindrical member 8 and having beveled faces. To coact with the beveled faces of these blocks the springs 11 are provided on their inner surfaces with a pair of blocks 16 also having beveled faces. Rearwardly of these blocks the cylindrical member is provided with a plurality of eye portions 17 disposed on diametrically opposed portions of the outer periphery thereof and slidable in these eyes are arms 18 carried by the springs and in spaced parallel relation thereto. From the foregoing it will be readily conceived that longitudinal inward movement of the springs 11 will cause the beveled faces of the blocks 15 and 16 to engage and thus force the adjacent ends of the springs carrying the jaw portions 12 away from the pin to permit withdrawal of the same. The pin and arm connection serves to prevent the lower ends of the springs from becoming laterally displaced.

In order to permit the springs 11 to be moved longitudinally so as to release the pin, the said springs are extended outwardly past the flanged end of the casing and are secured to a button 19. The diameter of the button is greater than the diameter of the space inclosed by the inwardly directed flange on the end of the casing to prevent undue inward movement of the said button. To prevent undue outward movement the attaching portions of the arms 18 carried by the springs bear against the eyes 17 of the cylindrical member 8. To normally hold the springs in operative position, a coil spring 20 surrounds a projection 21 on the inner face of the button and surrounds the lower end of the cylindrical member 8, said spring bearing against a pin 22 on the cylindrical member and the inner face of the button.

From the foregoing it will be observed that to lock the guard on the pin which is preferably provided with notches or circumscribing grooves 23 to receive the jaws of the springs of the guard, it is only necessary to insert the pin therein. To release the pin, the button 19 is pushed inwardly.

It will be understood that various changes and modifications within the scope of the appended claims may be made without departing in any degree from the spirit of the invention.

What is claimed, is:—

1. A hat pin guard comprising a casing, an inner tubular member spaced from the wall of the casing, leaf springs disposed on each side of the member, beveled surfaces formed on the member, coacting beveled surfaces formed on the inner ends of the springs whereby longitudinal movement of said springs will cause the ends thereof to move apart, and means for moving the springs longitudinally of the member.

2. A hat pin guard comprising a casing, an inner tubular member spaced from the wall of the casing, leaf springs disposed on each side of the member and extending outwardly at one end past the casing, a button secured to the extended ends of the springs, eye portions carried by the tubular member, arms carried by the springs and slidable in the eyes, the said member being provided with beveled faces and the springs being provided with coacting beveled faces adjacent the inner ends thereof whereby longitudinal movement of the springs will cause the inner ends thereof to move with relation to each other.

3. A hat pin guard comprising a casing, a tubular member spaced from the wall of the casing and provided adjacent the receiving end with opposed openings, leaf springs disposed on each side of the member and provided with jaws extending into said openings to engage a pin and having their other end portions extended past the casing, a button on said ends, means for holding the last mentioned end portions in parallel relation to the tubular member, beveled surfaces on the other ends of the springs, coacting beveled surfaces on the tubular member whereby longitudinal movement of the springs will cause the jaws to move with relation to each other, and means for normally holding the jaws in operative relation.

In testimony whereof, I affix my signature, in the presence of two witnesses.

VICTOR MICHET.

Witnesses:
 GEO. T. CUNCH,
 R. E. BOLL.

Copies of this patent may be obtained for five cents each, by addressing the "Commissioner of Patents, Washington, D. C."